March 2, 1943. F. SIEGMANN 2,313,028
PROCESS FOR THE PRODUCTION OF SODIUM AND POTASSIUM HYDRIDE
Filed June 19, 1940
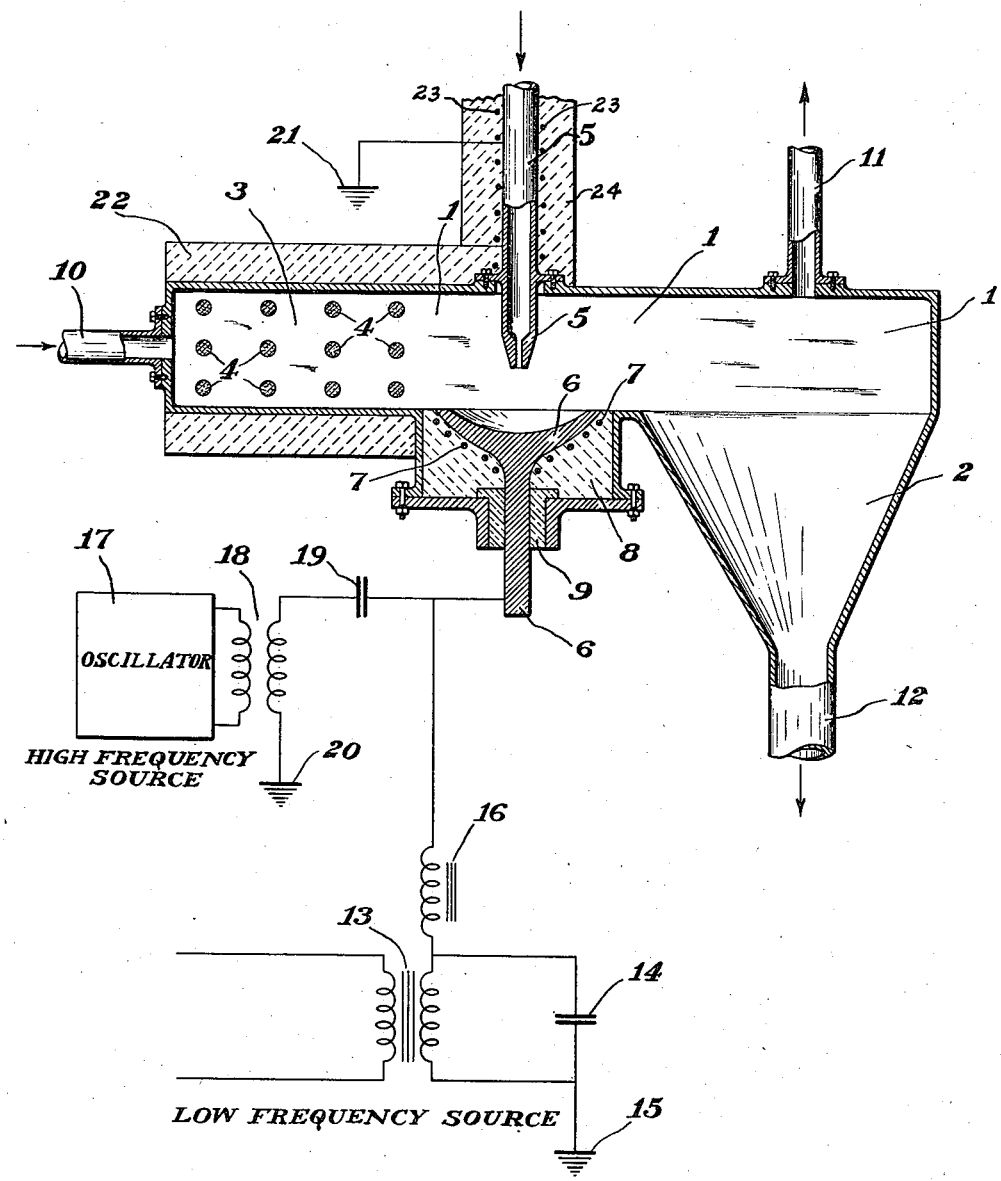
INVENTOR.
FRIEDRICH SIEGMANN
BY
ATTORNEY.

Patented Mar. 2, 1943

2,313,028

UNITED STATES PATENT OFFICE 2,313,028

PROCESS FOR THE PRODUCTION OF SODIUM AND POTASSIUM HYDRIDE

Friedrich Siegmann, Frankfort-on-the-Main, Germany; vested in the Alien Property Custodian Application June 19, 1940, Serial No. 341,337
In Germany May 4, 1939

7 Claims. (Cl. 204—164)

My invention relates to the production of sodium and potassium hydride by means of evaporation in the presence of hydrogen.

For the production of sodium and potassium hydride in a technical scale the proposal has formerly been made to bring these metals in evaporated form into reaction in the presence of hydrogen. But it has proved impossible to put this process into practice owing to the fact that sodium as well as potassium vapors very strongly attack the metals of the apparatus at the required temperatures of about 800–1000° C., whereby the yield decreases accordingly. Furthermore, the proposal was made to subject finely divided sodium and potassium metal together with diluents to the influence of hydrogen. This process has the disadvantage that no pure hydride can be obtained insofar as it contains the diluent and also impurities which are introduced in the finely divided metals during the grinding process. The yield is not satisfactory in this method.

Now I have found that according to my invention it is possible to obtain an absolutely pure product in a practically quantitative yield by reacting sodium or potassium, evaporated in an electric arc, in the presence of hydrogen. For this purpose I use a vessel filled with hydrogen maintained at a temperature of about 300° C. during the reaction into which two sodium electrodes are immersed. From the top a tube leads into the reaction chamber. A narrow aperture at the lower end of the tube allows the sodium to drop into the electric arc for evaporation. The sodium is maintained liquid by maintaining suitable temperatures, the electrode being equipped with a heating device. I prefer to keep the sodium under pressure. The second electrode is introduced from below; the upper end of it is dish-shaped. The heatable electrode is also arranged in the heated gas chamber and contains sodium in a liquid state. Then a voltage of, for instance, 110 volts is maintained at both electrodes together with an additional high frequency voltage, in order to prevent an obstruction of the electrodes and to penetrate the film of hydride which is formed in the dish.

The appended drawing illustrates one form of apparatus suitable for practicing my invention. This consists of an enclosed space or reaction chamber 1 which has a conical portion 2 in its lower part. One side of the reaction chamber 1 is extended into a passageway 3 having a square cross-section and containing therein a series of electrical heating elements 4. Extension 3 of chamber 1 is covered with a layer of heat insulation 22. Adjacent to the inner end of passageway 3 are situated electrodes 5 and 6. Electrodes 5 and 6 are arranged to be heated by means of electrical heating elements 7 and 23 which are embedded in refractory insulating material 8 and 24 which surrounds the electrodes. The upper face of electrode 6 is dish-shaped. The lower portion of electrode 6 extends out through insulating bushing 9 to the exterior of the reaction chamber. Electrode 5 is a hollow tube having an opening in its lower end of relatively small diameter adapted to permit liquid metal to flow out drop-wise. The reaction chamber is further provided with gas inlet pipe 10, gas outlet pipe 11, and an outlet for solid pulverulent product 12. Product outlet pipe 12 may be provided as desired with conventional valve means for controlling the flow of solid product from the apparatus.

Electrode 6 is connected with an electrical device shown diagrammatically in the drawing which supplies to the apparatus an electrical current consisting of a low frequency current, for example, 20–80 cycle alternating current, with a superimposed high frequency current. The source of low frequency current is the transformer 13 which is connected as shown with condenser 14 and ground 15. This low frequency source is connected through choke coil 16 to the conductor leading to insulated electrode 6. To this same conductor is connected the lead from the high frequency apparatus. This consists of oscillator 17, high frequency transformer 18, and condenser 19. The high frequency transformer 18 is connected to ground 20 as shown. To complete the circuit between the electrodes in the reaction chamber 1, electrode 5 is connected to ground 21.

In operating this apparatus to produce alkali metal hydride in accordance with my invention, the heating elements 4 and 7 are energized by means of electrical connections not shown to produce the desired temperatures. Heating element 7 is operated to keep the dished part of electrode 6 at a temperature above the melting point of the alkali metal to be reacted; for example, in the case of sodium this temperature may be 100–300° C. Heating elements 4 are operated so as to heat incoming hydrogen gas to a temperature in the neighborhood of 300° C. Liquid alkali metal is supplied to the interior of hollow electrode 5 from a suitable storage tank not shown. The portion of electrode 5 extending outside of the reaction chamber and the storage tank and conduit leading therefrom to electrode 5 are heated by electrical heating elements not shown, in order to maintain the sodium in the liquid state at all times. The sodium flowing into hollow electrode 5 is maintained under pressure as necessary to maintain a continuous flow of the liquid metal out through the small opening in the tip of the electrode. Preferably the flow is maintained at such a rate that the sodium emerges from the electrode drop by drop. The drops of sodium fall into the dish of electrode 6, where a pool of the molten metal is collected. Electric current is then passed to cause the formation of an electric arc between the down-flowing drops of sodium and the pool of molten sodium in the dish of the lower electrode. This causes vaporization of the sodium and the flow of sodium through electrode 5 and the flow of electric current are so adjusted that the sodium is continuously vaporized while a pool of liquid is continuously maintained in the dish of electrode 6. At the same time, dry hydrogen gas is passed into the apparatus through pipe 10 and over heating elements 4 where it becomes heated to a temperature of about 300° C. Sodium thus vaporized in the atmosphere of the hot hydrogen rapidly reacts with hydrogen so that substantially all of the sodium vapor is converted to finely divided sodium hydride. If desired, the flow of hydrogen may be in excess of that required to react with the sodium. If theoretical quantities are used, the hydrogen is substantially completely reacted. I prefer to use a slight excess of hydrogen, to insure complete reaction of the sodium. Any unreacted hydrogen escapes through outlet pipe 11 and if desired may be recycled back to inlet pipe 10. The solid sodium hydride thus formed falls into the conical portion 2 of the chamber 1 and may be drawn off therefrom as desired from outlet pipe 12.

It has proved advantageous to utilize tungsten steel alloys or the like for the orifice of the upper electrode. The upper electrode consists therefore either of a sodium or of a potassium drop, evaporating in the electric arc between the dish of one electrode and the counter electrode. The reaction vessel surrounding the electrodes is, for example, conically shaped in its lower end, to discharge the formed hydride more easily, whilst the supply for the hydrogen is placed at another point. Thus it is possible to transform the evaporated sodium or potassium practically quantitatively into the corresponding hydride whereby a perfectly pure snow white product will be obtained owing to the fact that no further operations or procedures are necessary.

What I claim is:

1. The process for preparing the hydride of an alkali metal selected from the group consisting of sodium and potassium which comprises vaporizing said metal in an electric arc between liquid alkali metal electrodes in the presence of hydrogen maintained at a temperature of about 300° C.

2. The process for preparing sodium hydride which comprises vaporizing sodium in an electric arc between liquid sodium electrodes, in an atmosphere of hydrogen maintained at a temperature of about 300° C.

3. The process for preparing sodium hydride which comprises flowing a stream of molten sodium drop-wise downwardly into a pool of molten sodium in such manner that a succession of freely falling drops of molten sodium fall towards said pool, surrounding said drops and said pool with hydrogen maintained at a temperature of about 300° C. and striking an electric arc between said pool and the successive drops so as to vaporize at least a part of each falling drop of sodium.

4. The process according to claim 1 in which a high frequency electric current is superimposed on the arc current.

5. The process according to claim 2 in which a high frequency electric current is superimposed on the arc current.

6. The process according to claim 3 in which a high frequency electric current is superimposed on the arc current.

7. A process for preparing sodium hydride which comprises striking an electric arc in an enclosed space between a body of liquid sodium and a down-flowing stream of liquid sodium so as to form sodium vapor, heating hydrogen to a temperature of about 300° C. and flowing said hydrogen into contact with said sodium vapor in close proximity to said arc.

FRIEDRICH SIEGMANN.